(12) United States Patent
Cai et al.

(10) Patent No.: US 7,283,589 B2
(45) Date of Patent: Oct. 16, 2007

(54) PACKETIZATION OF FGS/PFGS VIDEO BITSTREAMS

(75) Inventors: Hua Cai, Kowloon (HK); Guobin Shen, Beijing (CN); Zixiang Xiong, College Station, TX (US); Shipeng Li, Irvine, CA (US); Bing Zeng, Kowloon (HK)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 10/385,014

(22) Filed: Mar. 10, 2003

(65) Prior Publication Data

US 2004/0179617 A1    Sep. 16, 2004

(51) Int. Cl.
*H04N 7/12*    (2006.01)
(52) U.S. Cl. ................................. 375/240.26
(58) Field of Classification Search ............ 348/387.1, 348/388.1, 554; 382/240, 232, 332; 375/240.26, 375/240.27, 240.16, 240.12, 240.01, 240.25
See application file for complete search history.

(56) References Cited

U.S. PATENT DOCUMENTS

| 5,533,021 | A |  | 7/1996 | Branstad et al. |
| 5,537,408 | A |  | 7/1996 | Branstad et al. |
| 5,946,318 | A |  | 8/1999 | Post |
| 6,021,440 | A |  | 2/2000 | Post et al. |
| 6,680,976 | B1 | * | 1/2004 | Chen et al. ............ 375/240.26 |
| 6,700,933 | B1 | * | 3/2004 | Wu et al. ............... 375/240.16 |

2002/0150158 A1 * 10/2002 Wu et al. ............... 375/240.12

OTHER PUBLICATIONS

Hua Cai, Guobin Shen, Zixiang Xiong, Shipeng Li, and Bing Zeng, "An Optimal Packetization Scheme for Fine Granularity Scalable Bitstream", 2002 IEEE International Symposium On Circuits and Systems (ISCAS 2002), Scottsdale, Arizona, vol. 5, pp. 641-644, May 26-29, 2002.
Hua Cai, Guobin Shen, Shipeng Li, and Bing Zeng, "Optimal Rate Allocation for Macroblock-based Progressive Fine Granularity Scalable Video Coding", 2002 IEEE International Conference on Image Processing (ICIP 2002), Rochester, New York, vol. 3, pp. 745-748, Sep. 22-25, 2002.
Xiaolin Wu, Samuel Cheng, and Zixiang, Xiong, "On Packetization of Embedded Multimedia Bitstreams", IEEE Transactions on Multimedia, vol. 3, No. 1, pp. 132-140, Mar. 2001.
Philip A. Chou and Zhourong Miao, "Rate-Distortion Optimized Streaming of Packetized Media", Tech. Report, MSR-TR-2001-35, Microsoft Research, Feb. 2001. http://www.research.microsoft.com.
Weiping Li, "Overview of Fine Granularity Scalability in MPEG-4 Video Standard", IEEE Transactions on Circuits and Systems for Video Technology, vol. 11, No. 3, pp. 301-317, Mar. 2001.

(Continued)

*Primary Examiner*—Tung Vo
*Assistant Examiner*—Behrooz Senfi
(74) *Attorney, Agent, or Firm*—Lee & Hayes, PLLC

(57) ABSTRACT

A video encoding system performs packetization of FGS/PFGS encoded video bitstreams by selecting encoded bitstream segments for packetization based on an estimated total contribution to distortion reduction associated with each encoded bitstream segment. The selected bitstream segments are then packetized according to a packet-independence packetization strategy that minimizes inter-packet dependency.

31 Claims, 12 Drawing Sheets

OTHER PUBLICATIONS

Feng Wu, Shipeng Li, and Ya-Qin Zhang, "A Framework for Efficient Progressive Fine Granularity Scalable Video Coding", IEEE Transactions on Circuits and Systems for Video Technology, vol. 11, No. 3, pp. 332-344, Mar. 2001.

Feng Wu, Shipeng Li, Bing Zeng, and Ya-Qin Zhang, "Drifting reduction in progressive fine granularity scalable video coding", in Proc. Picture Coding Symposium'01, Seoul, Korea, Apr. 2001.

Xiaoyan Sun, Feng Wu, Shipeng Li, Wen Gao, and Ya-Qin Zhang, "Macroblock-based progressive fine granularity scalable video coding", in Proc. ICME'01, Tokyo, Japan, Aug. 2001.

Qi Wang, Zixiang Xiong, Feng Wu, Shipeng, Li, "Optimal Rate Allocation for Progressive Fine Granularity Scalable Video Coding", IEEE Signal Processing Letters, vol. 9, pp. 33-39, Feb. 2002.

M. Van Der Schaar & Y.-T. Lin, "Content-Based Selective Enhancement for Streaming Video," Philips Research USA, Briarcliff Manor, NY 10510, copyright 2001 IEEE, pp. 977-980.

Bernd Girod, "Error-Resilient Mobile Video By Edge Adapted Multiscale Transforms," Information Systems Laboratory, Stanford University, copyright 2001 IEEE, p. 572.

* cited by examiner

PACKETIZATION OF FGS/PFGS VIDEO BITSTREAMS

TECHNICAL FIELD

This invention relates to data packetization and, in particular, to packetization of fine granularity scalable (FGS) and progressive fine granularity scalable (PFGS) bitstreams.

BACKGROUND

Due to increasing popularity of multimedia streaming over networks, such as the Internet, streaming performance is an important issue. Typically, there are two factors that affect streaming performance. The first is the fact that available network bandwidth may vary over time depending on the amount of network traffic. The second is the fact that current delivery processes are not error free, due to the best-effort nature of the current Internet. This results in data packets being occasionally lost during transmission. Due to the nature of common video encoding methods, it is common for data in one data packet to depend on data that is contained in a previous data packet, accordingly, performance of streaming video suffers when data packets are not received.

Various video encoding methods can be implemented to address the first issue, that of varying available bandwidth. Such methods include a fine granularity scalable (FGS) encoding scheme, a frame-based progressive fine granularity scalable (PFGS) encoding scheme, and a macroblock-based PFGS encoding scheme, each of which is an improvement upon the previous in terms of adapting to available bandwidth variance. Although FGS/PFGS encoding methods can effectively improve performance of streaming video over networks with varying bandwidth, they do not address performance decreases caused by lost data packets.

Independent development efforts have also focused on ways of improving the delivery of data packets over a network. This work has shown that performance improvement has an inverse relationship to the degree of inter-packet dependency. That is, streams of data packets that do not depend on one another result in greater performance than streams of data packets that depend heavily on one another.

Accordingly, there is a need to establish a method for packetizing FGS/PFGS encoded video bitstreams such that dependency among the resulting data packets is minimized.

SUMMARY

Packetization of FGS/PFGS video bitstreams to minimize inter-packet dependency is described. A video encoding system encodes a video stream according to an FGS/PFGS coding scheme, resulting in encoded bitstream segments. A set of the encoded bitstream segments is then selected based on each bitstream segment's total contribution to distortion reduction and based on an available bandwidth. The selected bitstream segments are then packetized into data packets such that inter-packet dependency is minimized.

BRIEF DESCRIPTION OF THE DRAWINGS

The same numbers are used throughout the drawings to reference like features and components.

DETAILED DESCRIPTION

The following discussion is directed to packetization of fine granularity scalable (FGS) and progressive fine granularity scalable (PFGS) video bitstreams in order to minimize the impacts of both bandwidth fluctuations and delivery process errors. FGS and PFGS coding schemes address the negative impacts of bandwidth fluctuations, while optimal delivery mechanisms are focused on improving streaming performance by minimizing errors introduced during the delivery process. Bitstreams with less dependency among packets result in reduced propagation of delivery errors as compared to bitstreams with more dependency among packets. Therefore, by optimizing the packetization of FGS/PFGS coded bitstreams to reduce the dependency among packets, bandwidth adaptation and optimal delivery can be synergistically integrated.

Exemplary System Architecture and Methods

Figure 1:
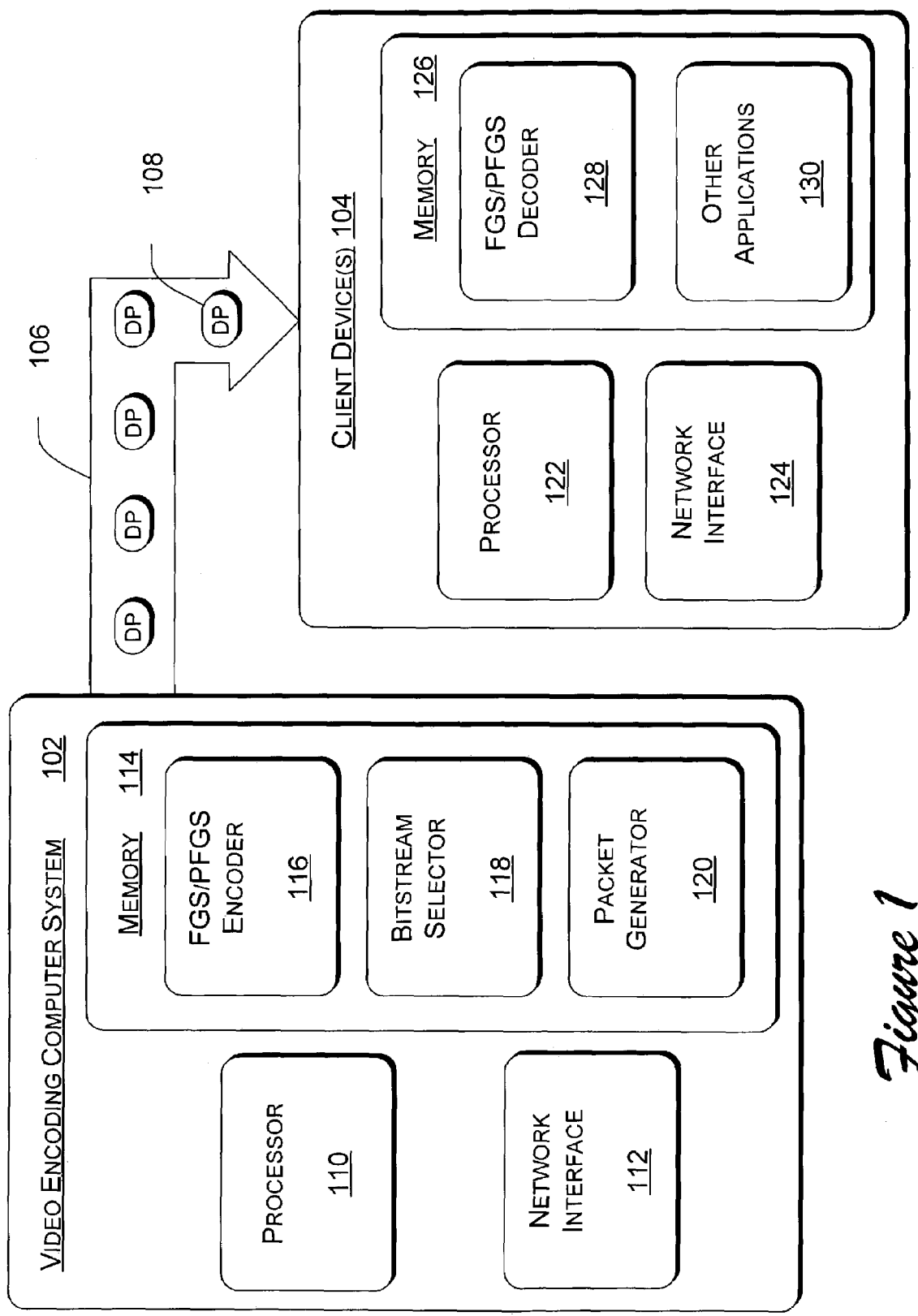
FIG. 1 illustrates an exemplary video encoding system in which packetization of FGS/PFGS video streams may be implemented.

FIG. 1 illustrates an exemplary streaming video system 100 that may be used to encode and packetize video bitstreams. Streaming video system 100 includes video encoding computer system 102 and one or more client devices 104 connected to computer system 102 by network 106. Video encoding computer system 102 encodes a video stream according to an FGS or PFGS coding scheme, and packetizes the encoded video stream according to a packetization scheme to minimize dependency between packets. Data packets 108 containing the encoded video stream are then transmitted to client device 104 via network 106.

Video encoding computer system 102 includes processor 110, network interface 112, and memory 114. Network interface 121 provides a mechanism for allowing video encoding computer system 102 to communicate with client device 104 via network 106. FGS/PFGS encoder 116, bitstream selector 118, and packet generator 120 are stored in memory 114 and executed on processor 110 to facilitate encoding and packetization of streaming video.

FGS/PFGS encoder 116 encodes a received video stream according to an FGS or PFGS encoding scheme. In an exemplary implementation, FGS/PFGS encoder 116 is implemented as a macroblock-based PFGS encoder. Alternatively, FGS/PFGS encoder 116 may be implemented as a frame-based PFGS encoder, or as an FGS encoder. Bitstream selector 118 determines an available bandwidth associated with network 106, and selects a preferred set of encoded bitstream segments based on each bitstream's position (frame, bitplane, and macroblock), required bitrate, and total contribution to distortion reduction. Packet generator 120 packetizes the selected set of encoded bitstream segments according to a packetization strategy, thereby generating data packets with minimal inter-packet dependency.

Client device 104 is configured to receive and decode the data packets generated and transmitted by video encoding computer system 102. Client device 104 includes processor 122, network interface 124, and memory 126. Network interface 124 facilitates receipt of data packets 108 from network 106.

FGS/PFGS decoder 128 along with other applications 130 are stored in memory 126 and executed on process 122. FGS/PFGS decoder 128 is configured to decode the received, encoded data packets 108 according to the same FGS/PFGS coding scheme implemented by FGS/PFGS encoder 116. Other applications 130 may include an application for displaying or otherwise rendering the decoded video streams using a display device (not shown).

Streaming Video Encoding Methods

Figure 2:
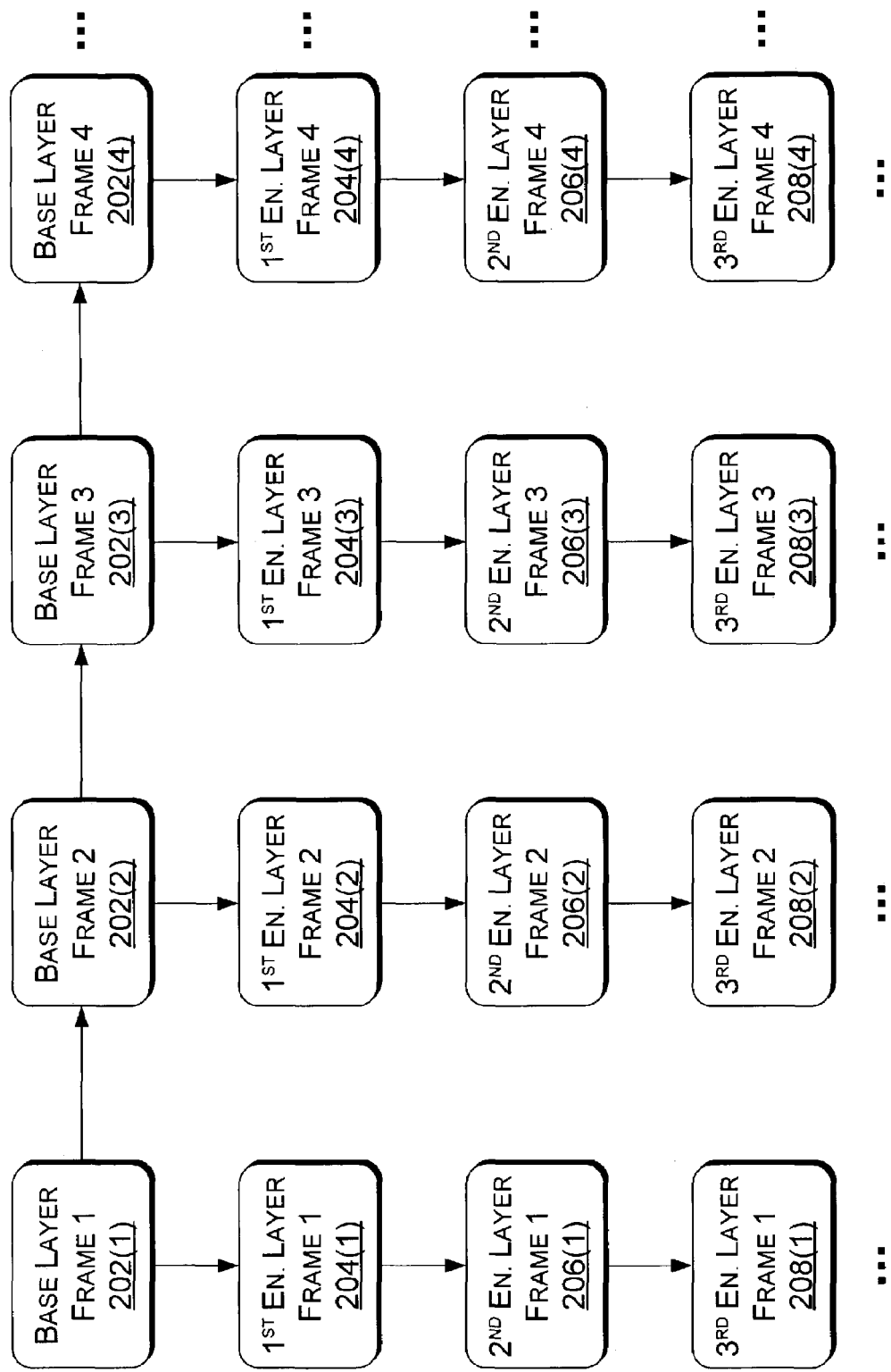
FIG. 2 illustrates an exemplary architecture of a fine granularity scalable (FGS) coding scheme.
Figure 3:
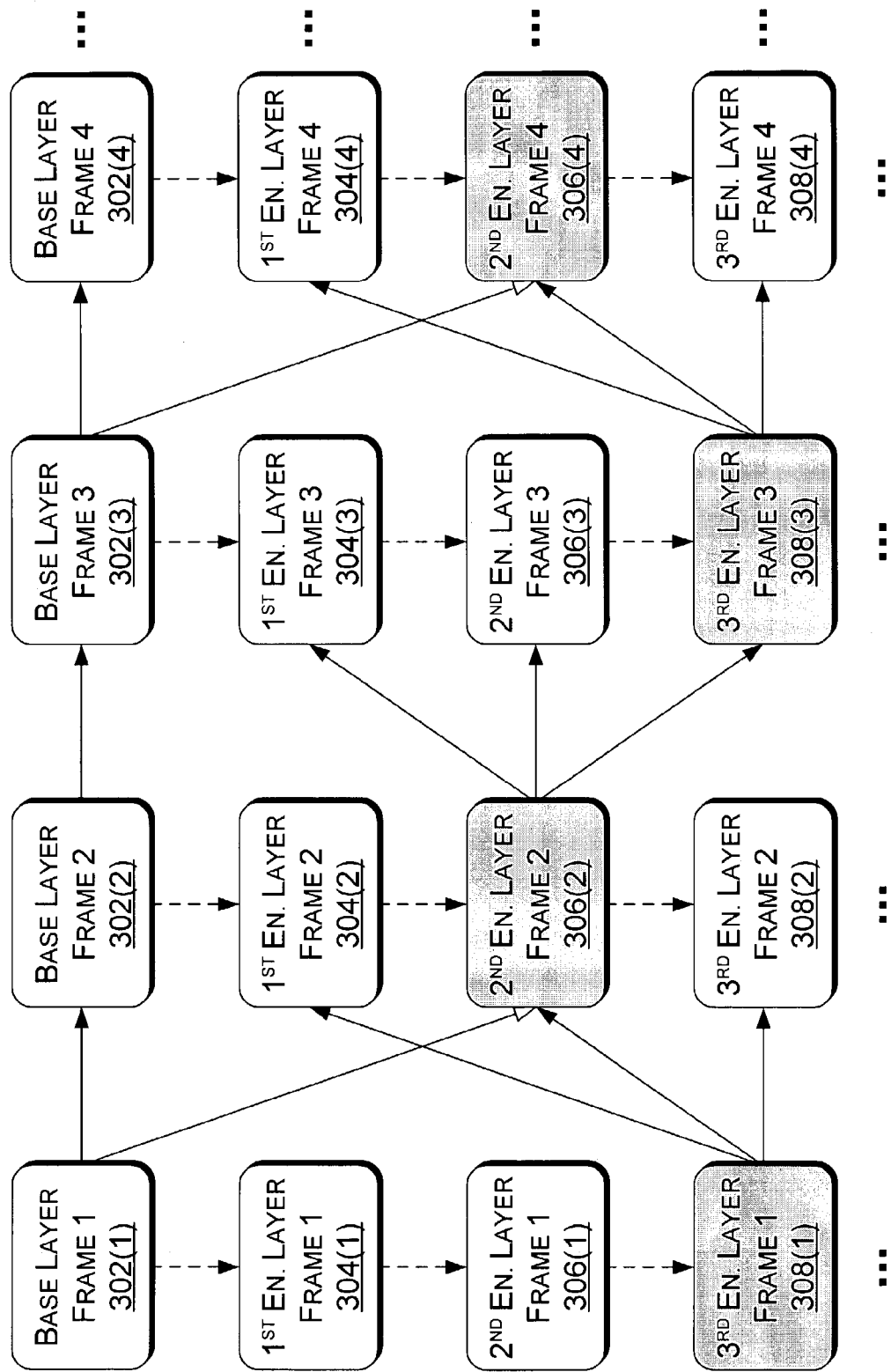
FIG. 3 illustrates an exemplary architecture of a frame-based progressive fine granularity scalable (PFGS) coding scheme with two references.
Figure 4:
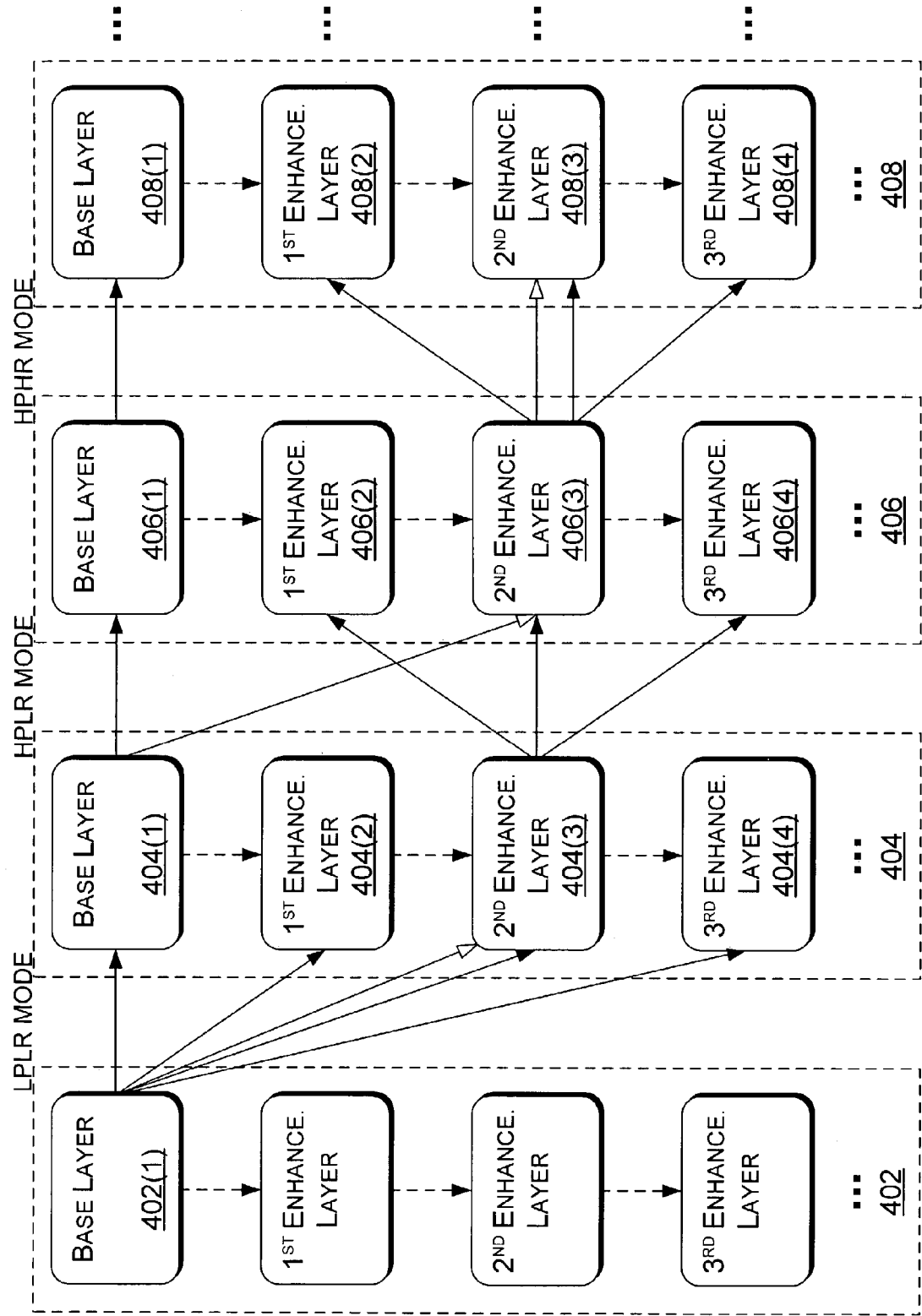
FIG. 4 illustrates an exemplary architecture of a macroblock-based PFGS coding scheme.

FIGS. 2-4 illustrate three exemplary methods for encoding video bitstreams. A fine granularity scalable (FGS) encoding scheme results in two bitstreams; a low quality base layer, and a high quality enhancement layer. An FGS encoded frame may be predicted from the base layer of a previous frame. An exemplary FGS encoding scheme is described in further detail below, with reference to FIG. 2.

A frame-based progressive fine granularity scalable (PFGS) encoding scheme also results in a low quality base layer and a high quality enhancement layer. In a PFGS encoded bitstream, a base layer of a frame may be predicted from the base layer of a previous frame (referred to as the reference frame), while the enhancement layer of the frame may be predicted from an enhancement layer of the reference frame. To minimize the propagation of error that may be caused by a lost or untransmitted high-quality reference bitstream, a high-quality reference may alternatively be reconstructed from a previous low-quality reference. An exemplary frame-based PFGS encoding scheme is described in further detail below, with reference to FIG. 3.

A macroblock-based PFGS encoding scheme improves upon the described frame-based PFGS encoding scheme by utilizing three coding modes and a decision-making mechanism for selecting a coding mode to be used for each enhancement layer macroblock. An exemplary macroblock-based PFGS encoding scheme is described in further detail below, with reference to FIG. 4.

Fine Granularity Scalable (FGS) Coding Scheme

FIG. 2 illustrates an exemplary architecture of an FGS coding scheme. FGS is a coding scheme that results in a bitstream that can be arbitrarily truncated based on available bandwidth, such that each truncated version of the bitstream is still fully decodable. As illustrated in FIG. 2, an FGS encoder generates two bitstreams: the base layer (represented by blocks 202(1), 202(2), 202(3), 202(4), . . . ) and the enhancement layers (represented by blocks 204(1), 204(2), 204(3), 204(4), . . . , 206(1), 206(2), 206(3), 206(4), . . . , 208(1), 208(2), 208(3), 208(4), . . . ).

The base layer 202 is coded by traditional motion compensated discrete cosine transform (DCT), common in other layered coding techniques. The base layer 202 is typically of low quality and is very thin to ensure that it will fit in even very small bandwidths. The residue between the original DCT coefficients and the dequantized base layer DCT coefficients forms the enhancement bitstream (204, 206, 208, . . . ), which is coded using bit-plane coding technology to yield an embedded bitstream. In an FGS encoded bitstream, the base layer and all enhancement layers in a predicted frame are coded from a reconstructed version of the lowest-quality base layer of a reference frame.

Frame-Based PFGS Coding Scheme

FIG. 3 illustrates an exemplary architecture of a frame-based progressive fine granularity scalable (PFGS) coding scheme with two references. PFGS is a coding scheme that improves upon FGS by predicting a frame's enhancement layer(s) from a reference frame's enhancement layer, while continuing to predict the frame's base layer from the reference frame's base layer. For example, as shown in FIG. 3, the base layer of the second frame 302(2) is predicted from base layer 302(1) of the first frame, and enhancement layers 304(2), 306(2), 308(2), . . . of the second frame are predicted from enhancement layer 308(1) of the first frame. Similarly, the base layer of the third frame 302(3) is predicted from base layer 302(2) of the second frame, and enhancement layers 304(3), 306(3), 308(3), . . . of the third frame are predicted from enhancement layer 306(2) of the second frame. Because the quality of a frame is higher at an enhancement layer than it is at the base layer, the frame-based PFGS coding scheme provides more accurate motion prediction than the FGS scheme, and thus improves the coding efficiency.

However, when transmitting a PFGS encoded bitstream, a high-quality enhancement layer reference for predicting future frames may be partially or completely lost due to truncation caused by a decrease in available bandwidth. In such a scenario, the decoder would have to use a corrupted high-quality reference or a low-quality base layer reference to predict the future frames. Because the encoder used a high-quality reference to predict the future frames, a drifting error will likely be introduced. To reduce the drifting errors, the PFGS coding scheme also incorporates a basic drifting control method of alternatively reconstructing a high-quality reference from a previous low-quality reference in an event that a previous high-quality reference is not available. For example, as illustrated in FIG. 3, if enhancement layer 308(2) is corrupted or lost during transmission, a new high-quality reference 306(2) is alternatively reconstructed from base layer 302(1) and enhancement layer 308(1) of frame 1.

Macroblock-Based PFGS Coding Scheme

Macroblock-based progressive fine granularity scalable (PFGS) coding is a coding scheme that improves upon frame-based PFGS by utilizing three coding modes and a decision-making mechanism for selecting a coding mode to be applied for each enhancement layer macroblock. The three modes are: low-prediction-low-reconstruction (LPLR), high-prediction-low-reconstruction (HPLR), and high-prediction-high-reconstruction (HPHR). By selectively choosing an appropriate mode for each macroblock to be coded, drifting errors are reduced at low bit rates and coding efficiency is improved at moderate and high bit rates, when compared to the FGS and frame-based PFGS coding schemes.

FIG. 4 illustrates the LPLR, HPLR, and HPHR modes of a macroblock-based PFGS coding scheme. Macroblock 404 is coded using the LPLR mode, macroblock 406 is coded using the HPLR mode, and macroblock 408 is coded using the HPHR mode. In FIG. 4, prediction is represented by is solid arrows and reconstruction is represented by hollow arrows.

According to the LPLR mode of a macroblock-based PFGS coding scheme, enhancement layer macroblocks are both predicted and reconstructed from a previous low quality reference. This is illustrated by the relationship between macroblock 402 (the reference) and macroblock 404 (the macroblock being coded). Base layer 404(1) and enhancement layers 404(2), 404(3), 404(4), . . . , are all predicted from base layer 402(1), which is a low-quality reference. Furthermore, enhancement layer 404(3) is also reconstructed for use as a reference to future macroblocks from base layer 402(1) (indicated by the hollow arrow).

According to the HPLR mode of a macroblock-based PFGS coding scheme, enhancement layer macroblocks are predicted from a previous high-quality reference, but are reconstructed from a previous low-quality reference. This is illustrated by the relationship between macroblock 404 (the reference) and macroblock 406 (the macroblock being coded). Base layer 406(1) is predicted from base layer 404(1), which is a low-quality reference; while enhancement layers 406(2), 406(3), 406(4), . . . , are predicted from enhancement layer 404(3), which is a high-quality reference. Enhancement layer 406(3) is reconstructed for use as a reference to future macroblocks from base layer 404(1) (indicated by the hollow arrow).

According to the HPHR mode of a macroblock-based PFGS coding scheme, enhancement layer macroblocks are both predicted and reconstructed from a previous high-quality reference. This is illustrated by the relationship between macroblock 406 (the reference) and macroblock 408 (the macroblock being coded). As in both the LPLR and HPLR modes, base layer 408(1) is predicted from base layer 406(1). Enhancement layers 408(2), 408(3), 408(4), . . . , are predicted from enhancement layer 406(3), which is a high-quality reference. Furthermore, enhancement layer 408(3) is reconstructed for use as a reference to future macroblocks from enhancement layer 406(3) (indicated by the hollow arrow).

Baseline Packetization Strategy

As described above, FGS, frame-based PFGS, and macroblock-based PFGS are encoding schemes that address the negative impacts of bandwidth fluctuations. The described encoding schemes, however, do not provide a means for minimizing the effect of errors caused by packet loss during delivery.

Figure 5:
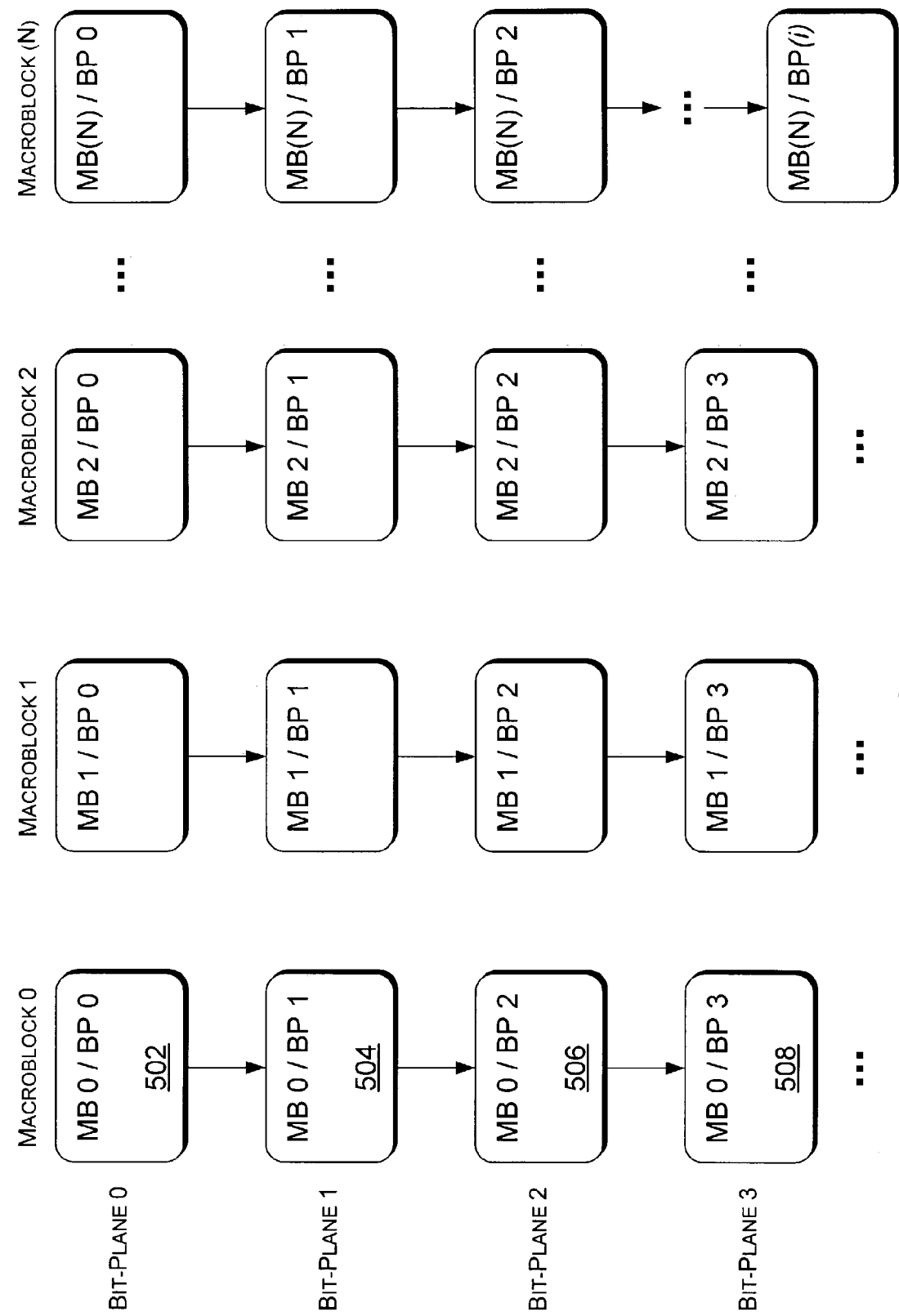
FIG. 5 illustrates dependencies between bit planes generated by FGS or PFGS coding schemes.

FIG. 5 illustrates the dependencies between FGS/PFGS bit-planes. According to the dependencies illustrated in FIG. 5, a bitstream segment is decodable only if all of its ancestors (i.e., the bitstream segments belonging to the same macroblock but in the lower bit-planes) are received and successfully decoded. For example, bitstream 504 is decodable only if bitstream 502 is received and successfully decoded. Similarly, bitstream 508 is decodable only if bitstreams 502, 504, and 506 are received and successfully decoded.

Figure 6:
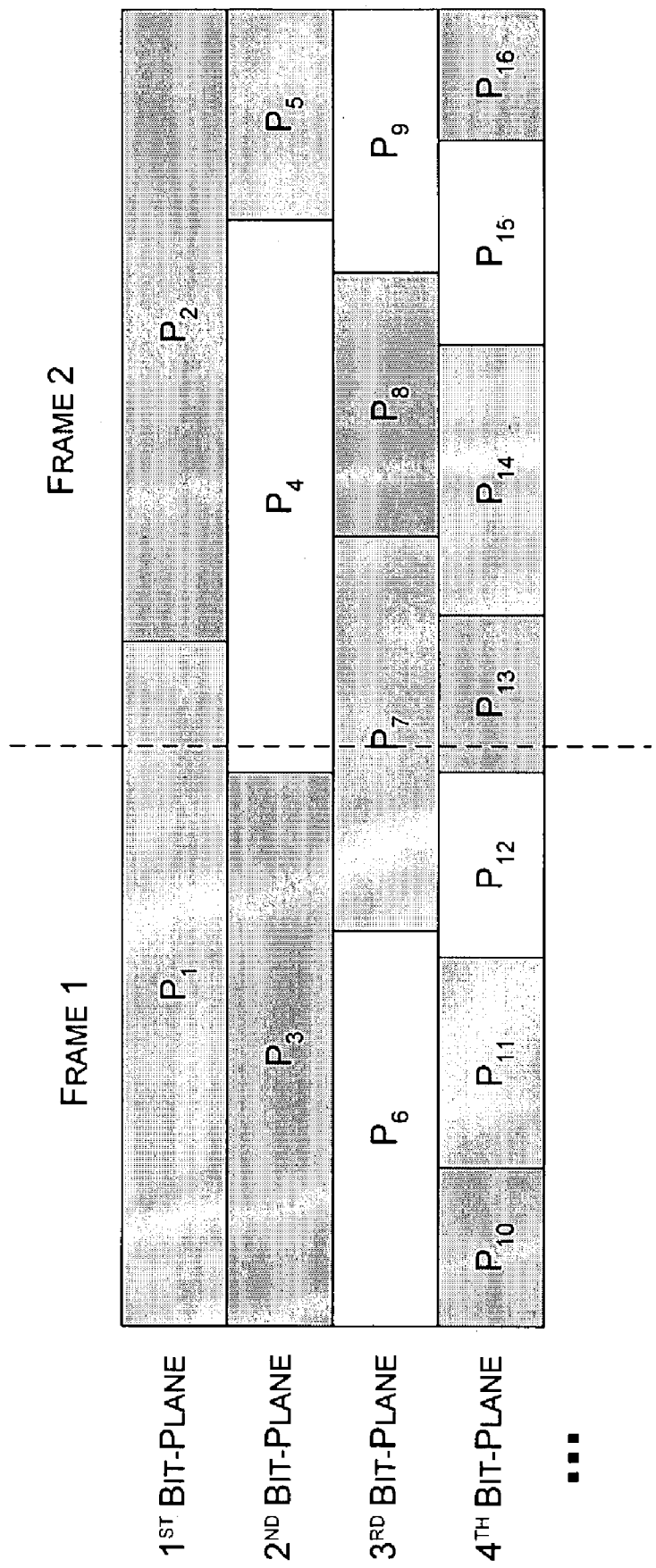
FIG. 6 illustrates packetization of two frames according to a baseline packetization strategy.

FIG. 6 illustrates packetization of two frames according to a baseline packetization strategy, which results in significant packet dependency. The illustrated baseline packetization strategy generates packets by scanning and grouping FGS/PFGS encoded bitstream segments in a raster-scan order, from the most significant bit plane to the least significant bit plane and from the left to the right within each bit plane. Whenever a pre-determined packet length is reached, a packet is formed, and any remaining portion of the bitstream is packetized in a new packet.

As a result, as illustrated in FIG. 6, packets $P_1$, $P_3$, $P_4$, $P_6$, $P_7$, $P_{10}$, $P_{11}$, $P_{12}$, and $P_{13}$ all include data associated with Frame 1. Similarly, packets $P_1$, $P_2$, $P_4$, $P_5$, $P_7$, $P_8$, $P_9$, $P_{13}$, $P_{14}$, $P_{15}$, and $P_{16}$ all include data associated with Frame 2. Additionally, packets $P_1$, $P_4$, $P_7$, and $P_{13}$ all contain both data that is associated with Frame 1 and data that is associated with Frame 2.

Considering the dependencies between FGS/PFGS bit-planes, as illustrated in FIG. 5, it can then be concluded that the data in packet $P_3$ and at least some of the data in packet $P_4$ is useless if packet $P_1$ is not successfully received and decoded. Similarly, data contained in packets $P_6$ and $P_7$ is useless if packets $P_1$, $P_3$, and/or $P_4$ are not successfully received and decoded. This can be extrapolated further, as follows: if packet $P_1$ is lost, then, because they are dependent on packet $P_1$, packets $P_3$, $P_6$, $P_{10}$, $P_{11}$, and $P_{12}$ are not decodable, even if they are received successfully. The lost packet also contaminates packet $P_4$, which may or may not be partially decodable, depending on the implementation of the decoder. The contamination of packet $P_4$ also propagates to packets $P_7$, $P_8$, $P_9$, $P_{13}$, $P_{14}$, $P_{15}$, and $P_{16}$. As a result, the loss of packet PI may render all of the other packets useless, except for packets $P_2$ and $P_5$.

The significant dependency between packets generated according to the described baseline packetization strategy is caused, in part, by the fact that there is no mechanism for aligning packets. A mathematical model for representing the performance of an encoded bitstream will now be developed and subsequently used as a basis for establishing two exemplary packetization strategies to reduce dependency between packets by aligning packets as they are generated.

FGS/PFGS Bitstream Performance Metric

A performance metric of streaming FGS/PFGS bitstreams over a network (e.g., the Internet) provides a mechanism for comparing alternate bitstream packetization strategies to determine a packetization strategy that results in improved performance.

As described above, in both FGS and PFGS coding, the enhancement layer is encoded using bit-plane coding technology. For each 8×8 DCT block, the 64 absolute values are zigzag ordered into an array. A bit-plane of the block is defined as an array of 64 bits, one from each absolute value of the DCT coefficients at the same significant position. For each bit-plane of each macroblock, (RUN, end-of-bitplane (EOP)) symbols are formed and then the variable-length coding (VLC) is applied, together with the sign bits to produce the output bitstream. After the bit-plane coding, the enhancement layer bitstreams are generated. These enhancement bitstreams could be separated into many bitstream segments, each containing the bitstream for one bit-plane of a macroblock. For the remainder of this discussion, the minimum manipulation unit will be such a bitstream segment. Because of the bit-plane coding used for producing the enhancement layer bitstreams, the dependency among bitstream segments associated with the same macroblock is very strong; whereas, there is no dependency among bitstream segments associated with different macroblocks. (As described above, the dependencies between FGS/PFGS bit-planes is illustrated in FIG. 5.)

The mathematical probability that a particular bitstream segment is decodable can be determined based on this information. To successfully decode a bitstream segment $S_i$ in the $i^{th}$ bit plane, $S_i$ must be received without error, and $S_{i-1}$ (i.e., the bitstream segment that belongs to the same macro block but in the lower $(i-1)^{th}$ bit plane) must also be decodable. Furthermore, in order for bitstream segment $S_{i-1}$ to be decodable, $S_{i-1}$ must be received and $S_{i-2}$ must also be decodable, and so on. In mathematical terms, this can be expressed as:

$$p(S_i \text{ decodable}) = p(S_i \text{ received}, S_{i-1} \text{ decodable}) \qquad (1)$$
$$= p(S_i \text{ received}, S_{i-1} \text{ received},$$
$$S_{i-2} \text{ received}, \ldots, S_0 \text{ received})$$

For example, the decodable probabilities for three bitstream segments, $S_0$, $S_1$, and $S_2$, all belonging to the same macroblock but in the $0^{th}$, $1^{st}$, and $2^{nd}$ bit planes, respectively, may be expressed as follows:

$$p(S_0 \text{ decodable}) = p(S_0 \text{ received})$$
$$p(S_1 \text{ decodable}) = p(S_1 \text{ received}, S_0 \text{ decodable})$$
$$= p(S_1 \text{ received}, S_0 \text{ received})$$
$$p(S_2 \text{ decodable}) = p(S_2 \text{ received}, S_1 \text{ decodable})$$
$$= p(S_2 \text{ received}, S_1 \text{ received}, S_0 \text{ received})$$

To simplify the above decodable probabilities, the joint probability $p(S_x \text{ received}, S_y \text{ received})$ is analyzed. If the bitstream segments $S_x$ and $S_y$ are packetized into the same packet, packet k, then the joint probability may be expressed as:

$$p(S_x \text{ received}, S_y \text{ received}) = p(S_x \text{ received}) = p(S_y \text{ received}) = p(\text{packet } k \text{ received})$$

If, however, bitstream segments $S_x$ and $S_y$ are packetized into different packets, packet j and packet k, then the joint probability may be expressed as:

$$p(S_x \text{ received}, S_y \text{ received}) = p(S_x \text{ received}) \times p(S_y \text{ received})$$
$$= p(\text{packet } j \text{ received}) \times$$
$$p(\text{packed } k \text{ received})$$

Hence, the probability that a bitstream segment is decodable is highly dependent on how its ancestor bitstream segments are packetized. For further simplification, a bitstream segment to packet mapping, $S \mapsto m$, is defined to represent the dependency that packet m must be received in order to decode the received bitstream segment m, where the packet m contains the ancestor bitstream segment(s) of S, but does not contain S itself. Thus, the decodable probabilities of $S_0$, $S_1$, and $S_2$ may be expressed as:

$$p(S_0 \text{ decodable}) = p(S_0 \text{ received})$$
$$p(S_1 \text{ decodable}) = p(S_1 \text{ received}) \times \prod_{S_1 \mapsto m} p(\text{packet } m \text{ received})$$
$$p(S_2 \text{ decodable}) = p(S_2 \text{ received}) \times \prod_{S_2 \mapsto m} p(\text{packet } m \text{ received})$$

In addition to different decodable probabilities, different bitstream segments may also have different contributions to distortion reduction. For a streaming system, the overall performance can be thought of as the total end-to-end distortion reduction, provided that a bandwidth constraint (which may be time-varying) is satisfied. Therefore, in addition to decodable probabilities, the distortion reduction of each bitstream segment should be considered. Therefore, a performance metric of streaming FGS/PFGS bitstreams over packet erasure networks may be defined as:

$$\vartheta_1 = \sum_{(f,l,i) \in I} \Delta D(f, l, i) \times (1 - p_e(f, l, i)) \times \prod_{(f,l,i) \mapsto m} (1 - p_e(m)) \qquad (2)$$

wherein the term (f, l, i) denotes the bitstream segment associated with the $f^{th}$ frame, $l^{th}$ bit plane, and $i^{th}$ macroblock. $\Delta D(f, l, i)$ represents the distortion reduction that is achieved if (f, l, i) is successfully decoded. $p_e(m)$ and $p_e(f, l, i)$ are, respectively, the packet loss probability of the $m^{th}$ packet and the packet containing the bitstream segment (f, l, i). $(f,l,i) \mapsto m$ denotes the bitstream segment to packet mapping as presented above. The selected bitstream segments set, I, represents all enhancement layer bitstream segments that will be transmitted in the current time slot (which corresponds to a bandwidth adjusting interval). The transmitting rate of I should satisfy:

$$\sum_{(f,l,i) \in I} \Delta R(f, l, i) \leq B \cdot \tau - R_{BL} - R_{ARQ} - R_{FEC} \qquad (3)$$

where $\Delta R(f, l, i)$ is the rate of the bitstream segment (f, l, i). B is the current estimated bandwidth, $\tau$ is the time slot length and $B \cdot \tau$ is the estimated available rate. $R_{BL}$ is the bit rate for the base layer bitstream. $R_{ARQ}$ and $R_{FEC}$ are, respectively, the total rates for retransmission and error protection for all packets, is including the base layer and the enhancement layer packets. A packetization scheme resulting in minimal inter-packet dependence is yielded when $\Theta_1$ is maximized.

Equation 2 provides a general performance metric that considers the dependency among bit planes in the enhancement layer bitstream, the dependency between the base layer and the enhancement layer bitstreams, and also the error protection on the enhancement layer packets. The influence of error protection is reflected through $p_e(\cdot)$. If unequal error protection (UEP) is adopted, $p_e$'s will be different for different enhancement layer packets. On the other hand, if equal error protection (EEP) or no error protection is adopted, $p_e$'s will be the same for all enhancement layer packets. Since the enhancement layer bitstream depends on the base layer bitstream, which is usually very thin, it is assumed that the base layer bitstream is transmitted correctly. Furthermore, for the sake of simplicity, no error protection is applied on the enhancement layer packets.

Accordingly, the performance metric defined above indicates two factors that should be considered when selecting a packetization system. Firstly, the bitstream segment set, I, that provides maximum distortion reduction for the available bandwidth should be selected. (Because the selection is based on the available bandwidth, the selection of bitstream segment set, I, can be explained in terms of rate allocation.) Secondly, a packetization strategy should be selected that minimizes the impact of packet loss (by minimizing the dependency between packets).

Rate Allocation

For each encoded bitstream segment, if the rate and contribution to distortion reduction are known, the selection of bitstream segment set, I, can be converted into a standard Langrangian minimization problem, and a preferred solution can be found by applying an equal-slope argument. For each FGS or PFGS enhancement layer bitstream segment, the corresponding rate is explicit, while its contribution to distortion reduction is not so obvious, especially for PFGS bitstreams.

For an FGS bitstream, the contribution of a certain enhancement bitstream segment consists only of the resultant distortion reduction for the current frame, and can be calculated precisely (based on the unitary property of the discrete cosine transform (DCT)) using the number of 1's in the residual bit plane in the DCT domain:

$$\Delta D_0(f,l,i) = n \times 2^{(L-l-1) \times 2} \quad (4)$$

where n is the number of 1's of the current $i^{th}$ MB in the $l^{th}$ bit-plane; l=0,1,2, . . . ; L−1 denotes the index of the bit-plane (l=0 denotes the most significant bit-plane and l=L−1 denotes the least significant bit plane); and L is the maximum number of bit planes in the $f^{th}$ frame.

Because a PFGS enhancement layer may be used as a high quality reference for a future frame, it can cause quality loss of the current frame (as is the case with an FGS enhancement layer) and can also cause drifting in the subsequent frames. Therefore, the contribution to distortion reduction of a particular PFGS bitstream segment is based on two parts: the distortion reduction for the current frame (as for an FGS bitstream segment) and drifting suppression for the subsequent frames. The contribution to distortion reduction of a PFGS bitstream segment may be expressed as:

$$\Delta D(f,l,i) = \Delta D_0(f,l,i) + \Delta D_{dr}(f,l,i) \quad (5)$$

where the terms $\Delta D_0(f,l,i)$ and $\Delta D_{dr}(f,l,i)$ denote, respectively, the distortion reduction and drifting suppression of bitstream segment (f,l,i).

Directly calculating the drifting suppression ($\Delta D_{dr}(f,l,i)$) is unrealistic in a practical system due to its extremely high computational complexity, and therefore must be estimated. Such an estimate will be determined based on an error propagation pattern associated with a PFGS coding scheme. As described above, the macroblock based PFGS coding scheme results in better performance than the frame-based PFGS coding scheme. Accordingly, the estimated drifting suppression is determined based on the macroblock-based PFGS coding scheme.

As described above with reference to FIGS. 3 and 4, according to the PFGS coding scheme, a high-quality reference at an enhancement layer is used for prediction. As a result, more accurate prediction is obtained and better coding efficiency is achieved as compared to an FGS coding scheme. On the other hand, drifting error is introduced if the high-quality reference bitstream is not received by the decoder (i.e., the encoder and decoder lose synchronization). To suppress the drifting error, the frame-based PFGS coding scheme restricts the maximal error propagation by periodically referencing a low-quality reference reconstructed from the base layer bitstream in both the encoder and the decoder. In this way, the encoder and the decoder are well synchronized and the drifting error propagation is well controlled. However, the macroblock-based PFGS coding scheme does not include a mechanism to guarantee the periodical resynchronization between the encoder and the decoder, and as a result, drifting errors may continue to propagate. The drifting error propagation is further complicated by the fact that the macroblock-based PFGS coding scheme implements three coding modes, namely, LPLR, HPLR, and HPHR.

Drifting errors are not propagated with the LPLR mode because prediction and reconstruction are both based on a low-quality base layer reference. With the HPLR mode, prediction errors may be propagated, but because reconstruction is based on a low-quality base layer reference, the prediction error is prevented from propagating further. With the HPHR mode, because both prediction and reconstruction are based on a high-quality enhancement layer reference, the prediction error may be propagated further to future frames.

To estimate the drifting suppression for a particular bitstream segment, it is assumed that, for each pixel in the current frame, the selection of coding mode LPLR, HPHR, or HPLR in the next frame is random. Let $R_{HH}(f)$ and $R_{HL}(f)$ respectively represent the percentage of the HPHR and HPLR modes in the $f^{th}$ frame. Therefore, for any pixel in the $f^{th}$ frame that is referenced by the $(f+1)^{th}$ frame, the probability that it is referenced in HPHR mode is $R_{HH}(f+1)$, and the probability that it is referenced in HPLR mode is $R_{HL}(f+1)$. Hence, the prediction error will be propagated to the $(f+1)^{th}$ frame with the probability $R_{HH}(f+1)+R_{HL}(f+1)$ and the $R_{HH}(f+1)$ portion of the error will continue to propagate.

Figure 7:
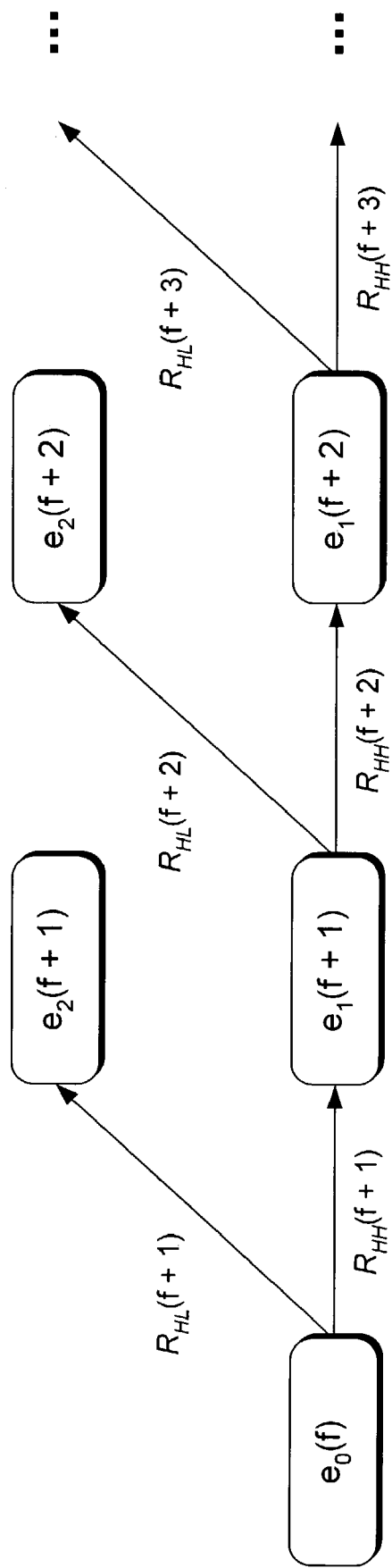
FIG. 7 illustrates an error propagation model for estimating the drifting suppression associated with PFGS bitstream segments.

FIG. 7 illustrates an error propagation model for estimating the drifting suppression for each bitstream segment based on the assumptions stated above. For example, if the $f^{th}$ frame, with distortion reduction $e_0(f)$ is not received, the drifting caused to the $(f+1)^{th}$ frame is approximately $e_0(f) \times R_{HH}(f+1)$ and $e_0(f) \times R_{HL}(f+1)$, denoted as $e_1(f+1)$ and $e_2(f+1)$, respectively. Additionally, $e_1(f+1)$ will be further propagated to the $(f+2)^{th}$ frame in the same way, and so on.

Accordingly, the drifting suppression attributed to a particular enhancement layer reference bitstream segment (f,l,i) can be represented as:

$$\Delta D_{dr}(f,l,i) = \quad (6)$$
$$\Delta D_0(f,l,i) \times \sum_{n=1}^{N} \left[ \prod_{k=1}^{n} R_{HH}(f+k) + \prod_{k=1}^{n-1} R_{HH}(f+k) \times R_{HL}(f+n) \right]$$

where N is the number of frames used for drifting estimation.

It then follows from equations (5) and (6) that the total contribution of bitstream segment (f,l,i) is:

$$\Delta D(f,l,i) = \Delta D_0(f,l,i) \times \quad (7)$$
$$\left\{ \sum_{n=1}^{N} \left[ \prod_{k=1}^{n} R_{HH}(f+k) + \prod_{k=1}^{n-1} R_{HH}(f+k) \times R_{HL}(f+n) \right] + 1 \right\}$$

After the rate and total contribution for each enhancement layer bitstream segment are obtained, the selection of a set of bitstream segments within the constraint of the available bandwidth can be converted into a standard Langrangian minimization problem, and a preferred solution can be found by applying the equal-slope argument.

Packetization Strategies to Minimize Impact of Packet Loss

As described above, the performance metric defined above in Equation (2) indicates two factors that should be considered when selecting a packetization system. First, the bitstream segment set, I, that provides maximum distortion reduction for the available bandwidth should be selected, and second, a packetization strategy should be selected that minimizes the impact of packet loss. Selection of bitstream segment set, I, is discussed above, and a discussion of selecting a packetization strategy follows.

Equation (2) indicates that streaming performance is sensitive to dependencies between packets. Accordingly, a packetization strategy that results in less inter-packet dependency will result in better performance. The following discussion will describes two packetization strategies that may be considered as alternatives to the baseline packetization strategy (described above with reference to FIG. 6). As described above, the baseline packetization strategy is simple and straightforward, but introduces heavy dependency among packets. The following discussion will describe a binary tree packetization strategy that greatly reduces the dependency among packets, and a packet-independence packetization strategy that eliminates dependency among packets.

Binary Tree Packetization Strategy

Figure 8:
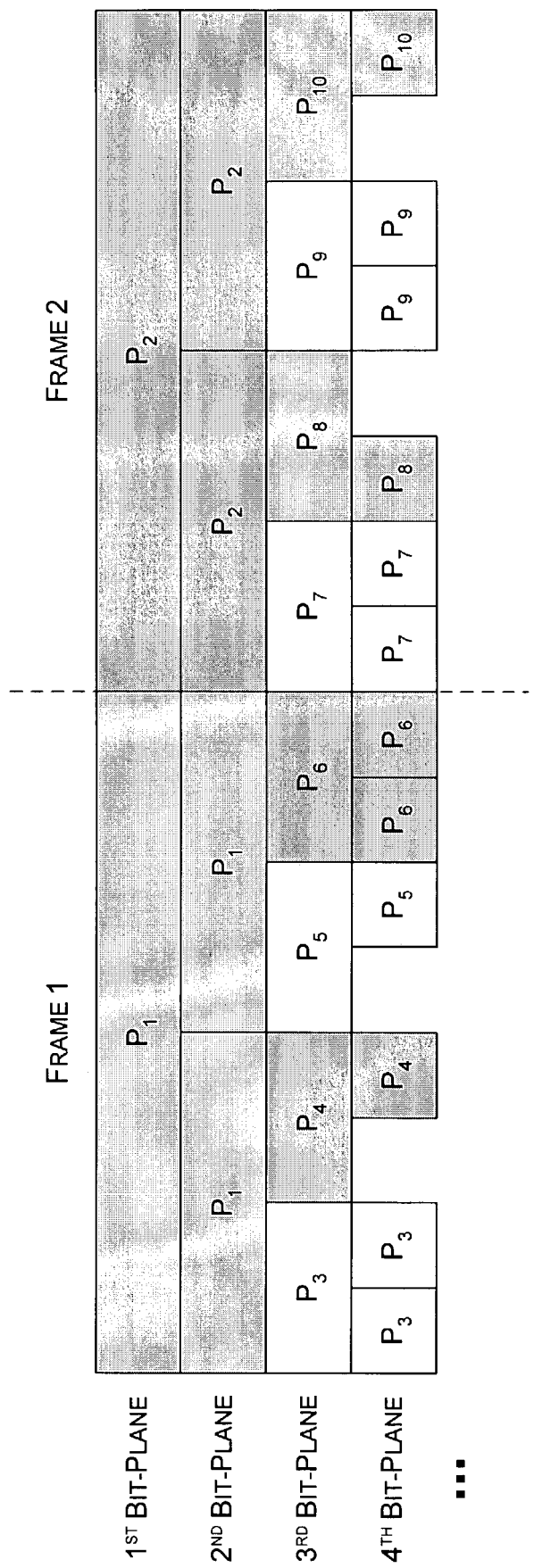
FIG. 8 illustrates packetization of two frames according to a binary-tree packetization strategy.

FIG. 8 illustrates packetization of two frames according to a binary tree packetization strategy, which results in significantly less packet dependency than that found with the baseline packetization strategy described above with reference to FIG. 6. Bitstream segments of FGS enhancement bit planes typically tend to increase in size approximately exponentially. Accordingly, the enhancement layers of a frame can be naturally represented by a binary tree wherein each node represents a segment of the bitstream and the edges represent dependencies. A well aligned binary tree structure is constructed by aligning a left child to the left of its parent and aligning a right child to the right of its parent in a top down fashion.

As illustrated in FIG. 8, the dependency among packets is significantly reduced. For example, if packet $P_1$ is lost, packets $P_3$, $P_4$, $P_5$, and $P_6$ are also impacted, but packets $P_2$, $P_7$, $P_8$, $P_9$, and $P_{10}$ remain fully decodable. A downside to the binary tree packetization strategy is that the packet size varies from node to node.

Each node in the binary tree is associated with a (rate, distortion) tuple. According to the available bit rate, the binary tree is pruned using a rate-distortion (R-D) criterion to select the nodes that result in the largest distortion reduction for the given bit rate. For example, for the frames illustrated in FIG. 8, some bitstream segments at the $4^{th}$ bit-plane are left out. In one implementation, a preferred transport packet length (e.g., 5 kilo-bits) is defined to allow a parent node and two child nodes to be grouped together into one transport packet.

Packet-Independence Packetization Strategy

Figure 9:
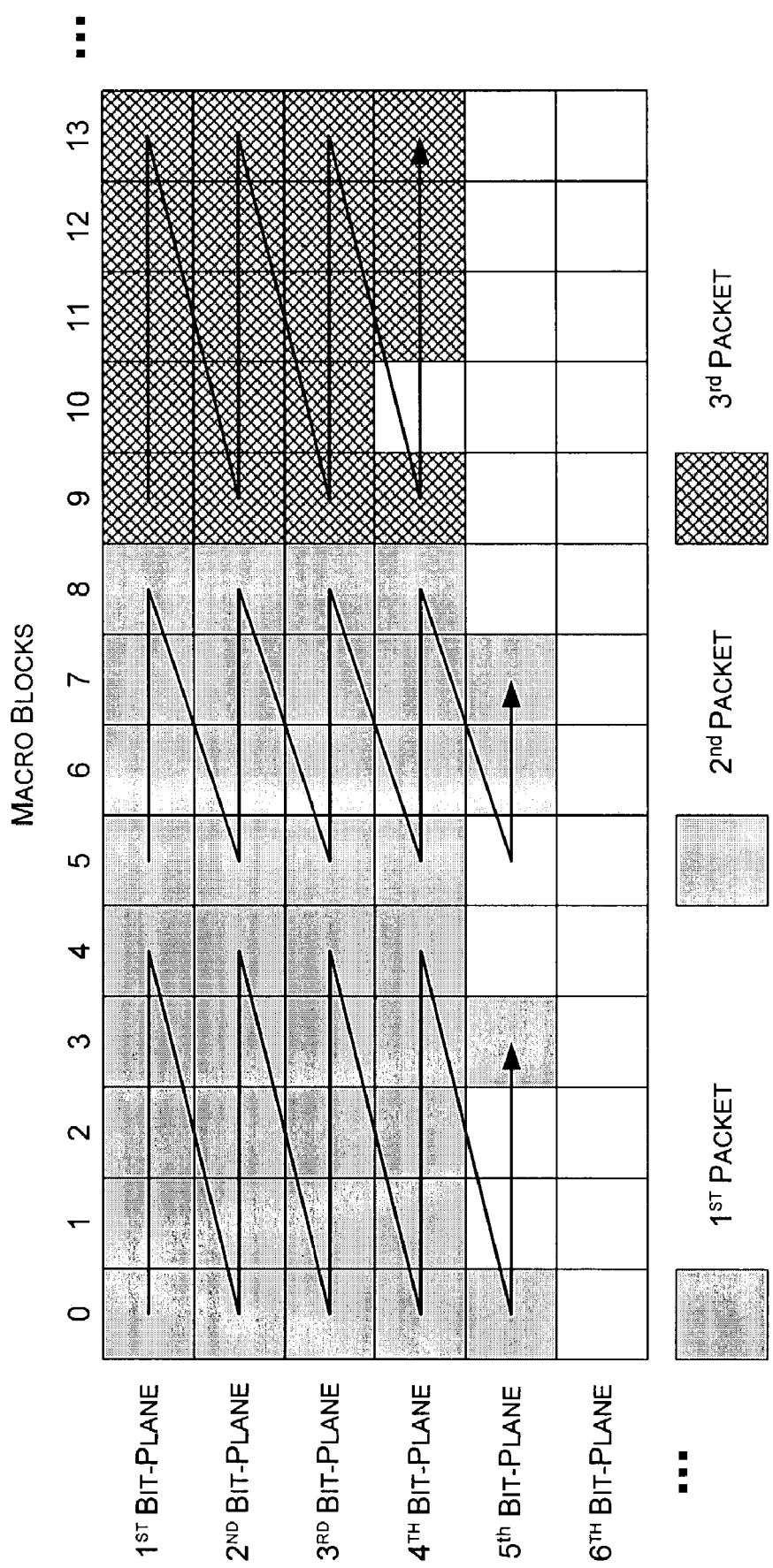
FIG. 9 illustrates packetization of several frames according to a macroblock-based packetization strategy.

FIG. 9 illustrates packetization of multiple macroblocks according to a packet-independence packetization strategy that eliminates dependency between packets. As discussed above, because of the bit-plane coding used in both FGS and PFGS coding schemes, there is strong dependency among enhancement layer bitstreams segments of the same macroblock, but no dependency among bitstream segments of different macroblocks. Accordingly, the packet-independence packetization strategy packetizes bitstream segments from all of the bit-planes of the same macroblock into the same packet. Therefore, the performance metric defined by Equation (2) can be reduced to:

$$\partial_2 = \sum_{(f,l,i) \in I} \Delta D(f, l, i) \times (1 - p_e(f, l, i)) \quad (8)$$

where the rate constraint remains unchanged.

As described above, the $\Delta D(f,l,i)$ term represents the distortion reduction that is achieved if (f,l,i) is successfully decoded. Using a macroblock as the smallest unit, an R-D based selection strategy is applied at the macroblock level. Each layer of a macroblock is represented by a (rate, distortion) tuple, and for a given target bit rate, the equal-slope argument in a Langrangian minimization problem is used to determine which macroblocks, and which layers of each macroblock should be selected such that the Lagrangian objective function D+λR is minimized. In other words, regardless which layers and which macroblocks the bitstream segments are from, only those bitstream segments that result in the most significant distortion reduction are selected while observing the bandwidth constraint. As illustrated in FIG. 9, different numbers of layers may be selected for each of the different macroblocks. For example, macroblock 10 includes only three layers, while macroblocks 0, 3, 6, and 7 each include five layers.

After bitstream selection, packets are generated in such a way that all of the selected bit-planes of the same macroblock are packetized into the same packet so as to eliminate packets dependencies. When a pre-determined packet length is reached, a packet is formed, and any remaining selected bitstreams from other macroblocks are packetized in new packets. Bitstream segments from multiple macroblocks may be packetized in the same packet, provided that all selected bitstream segments from a given macroblock are packetized in the same packet.

As illustrated by the arrows in FIG. 9, raster-scan ordering is employed to facilitate packing the bitstream segments into the same packet. The raster-scan ordering results in the bitstream segments being packed in order according to their R-D contribution from the most important bitstream segment to the least important bitstream segment.

Methods for Packetization of FGS/PFGS Video Bitstreams

FGS/PFGS video bitstream packetization as performed by a video encoding computer system 102 may be described in the general context of computer-executable instructions, such as application modules, being executed by a computer. Generally, application modules include routines, programs, objects, components, data structures, etc. that perform particular tasks or implement particular abstract data types. An FGS/PFGS video bitstream packetization system may be implemented using any number of programming techniques and may be implemented in local computing environments or in distributed computing environments where tasks are performed by remote processing devices that are linked through various communications networks based on any number of communication protocols. In such a distributed computing environment, application modules may be located in both local and remote computer storage media including memory storage devices.

Figure 10:
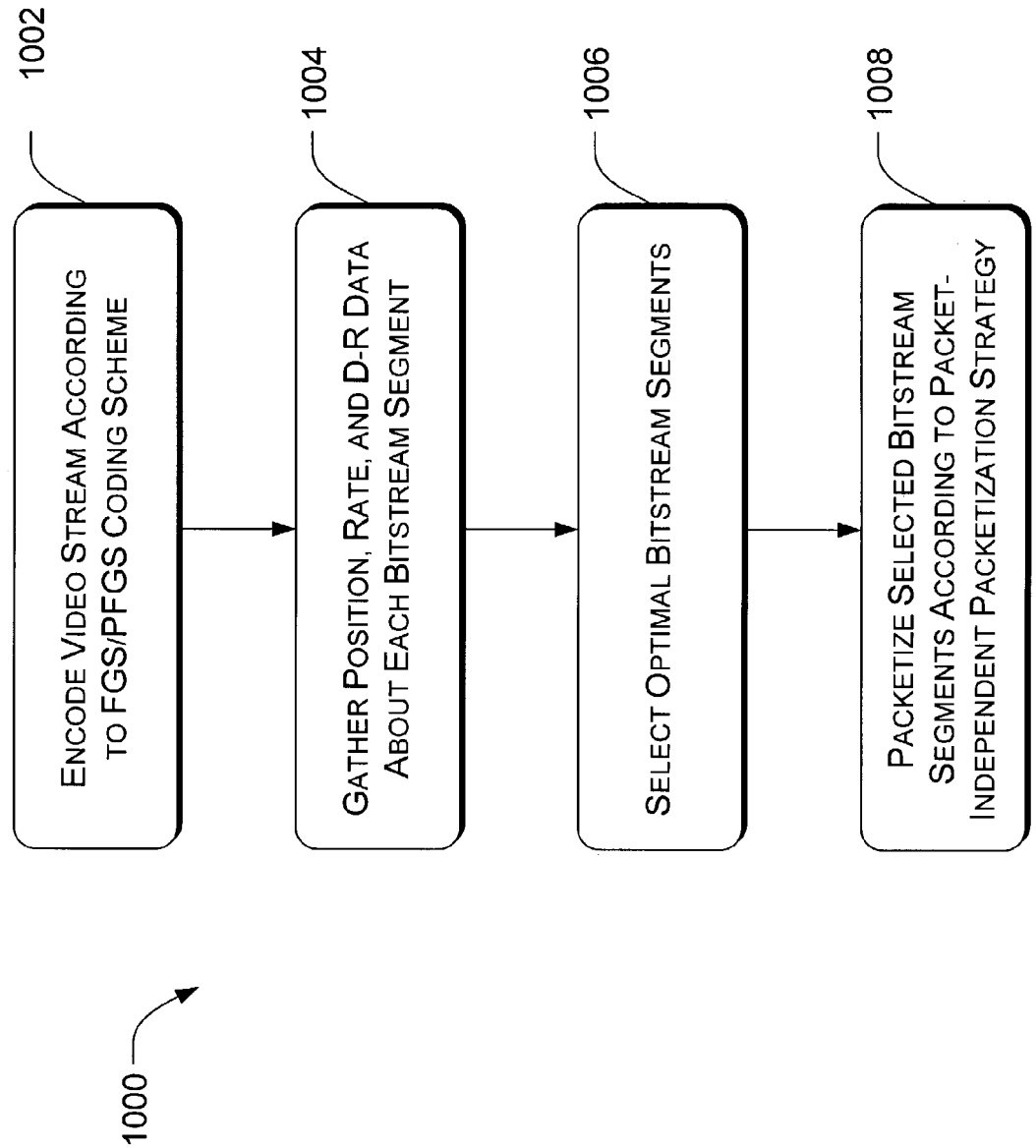
FIG. 10 illustrates an exemplary method for encoding and packetizing a video bitstream.

FIG. 10 illustrates an exemplary method for encoding and packetizing video streams. For illustrative purposes, FIG. 10 will be described with reference to components illustrated in FIG. 1.

At block 1002, a video stream is encoded according to an FGS/PFGS coding scheme. For example, FGS/PFGS encoder 116 of video encoding computer system 102 receives a video stream to be encoded, and applies a macroblock-based PFGS coding scheme, resulting in a set of encoded video bitstream segments (e.g., as described with reference to FIG. 4).

At block 1004, video encoding computer system 102 gathers data associated with a position, a required bitrate, and total contribution to distortion reduction for each encoded bitstream segment. In one implementation, the data is gathered as part of the encoding process (described with reference to block 1002). Alternatively, the data may be gathered during a separate process after the bitstream segments are encoded. An exemplary method for gathering data during an FGS/PFGS encoding process is described in more detail below with reference to FIG. 11.

At block 1006, bitstream selector 118 determines a set of bitstream segments for packetization. In the described implementation, the set of bitstream segments is selected based on each bitstream's position (frame, bitplane, and macro block), required bitrate, and total contribution to distortion reduction. An exemplary method for selecting a set of bitstream segments is described in further detail below with reference to FIG. 12.

At block 1008, packet generator 120 packetizes the selected set of bitstream segments according to a packetization strategy to minimize inter-packet dependency. One implementation utilizes the described binary tree packetization strategy, while an alternate implementation utilizes the described packet-independence packetization strategy. In one implementation, raster-scan ordering is employed such that the selected bitstream segments are ordered within a packet according to their contribution to distortion reduction, from the most important bitstream segment to the least important bitstream segment.

Figure 11:
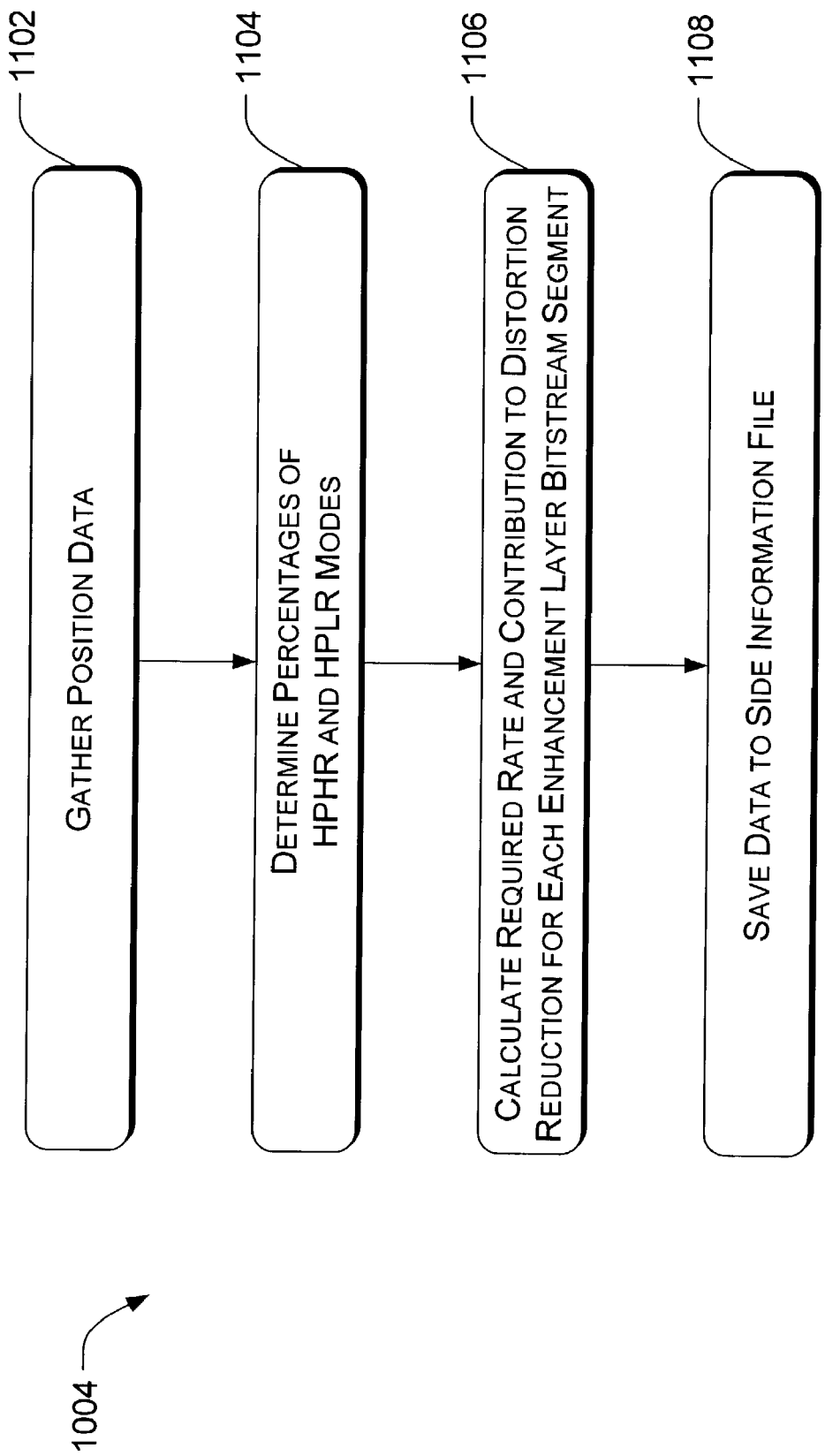
FIG. 11 illustrates an exemplary method for gathering data associated with an encoded video bitstream to support selection of a set of bitstream segments to be packetized.

FIG. 11 illustrates an exemplary method 1004 for gathering data associated with a position, a required bitrate, and total contribution to distortion reduction for each encoded bitstream segment.

At block 1102, FGS/PFGS encoder 116 gathers position data (including which frame, which bitplane, and which macroblock) for each encoded bitstream segment. The position is readily available to the encoder during the encoding process, and is easily recorded.

At block 1104, FGS/PFGS encoder 116 determines a percentage of HPHR modes and HPLR modes for each enhancement layer bitstream segment in the current frame. (If encoding based on an FGS coding scheme, both of these values are equal to zero.)

At block 1106, FGS/PFGS encoder 116 calculates a required bitrate and a total contribution to distortion reduction for each encoded enhancement layer bitstream segment. In the described implementation, the drifting suppression is initialized to zero for each bitstream segment that is not used as a high quality reference, because no drifting distortion will be propagated to future frames. This data is saved to a buffer for use in determining future drifting estimations.

An estimated drifting contribution is then calculated for each enhancement layer bitstream segment that is used as a high quality reference. A relatively small number of frames can be used to estimate the drifting suppression due to the fact that drifting is attenuated as distance between frames increases. In the described implementation a group of N frames (e.g., 10) is used to compute an estimated drifting suppression. For every previous frame (within the distance of N frames) the drifting suppression associated with the frame is estimated and updated based on the percentages of HPHR and HPLR modes in the current frame. The drifting suppression is then accumulated to the toal contribution.

At block 1108, after all N frames of drifting suppression have been estimated, the gathered data is output to a side information file to be used to select a set of bitstream segments for packetization.

Figure 12:
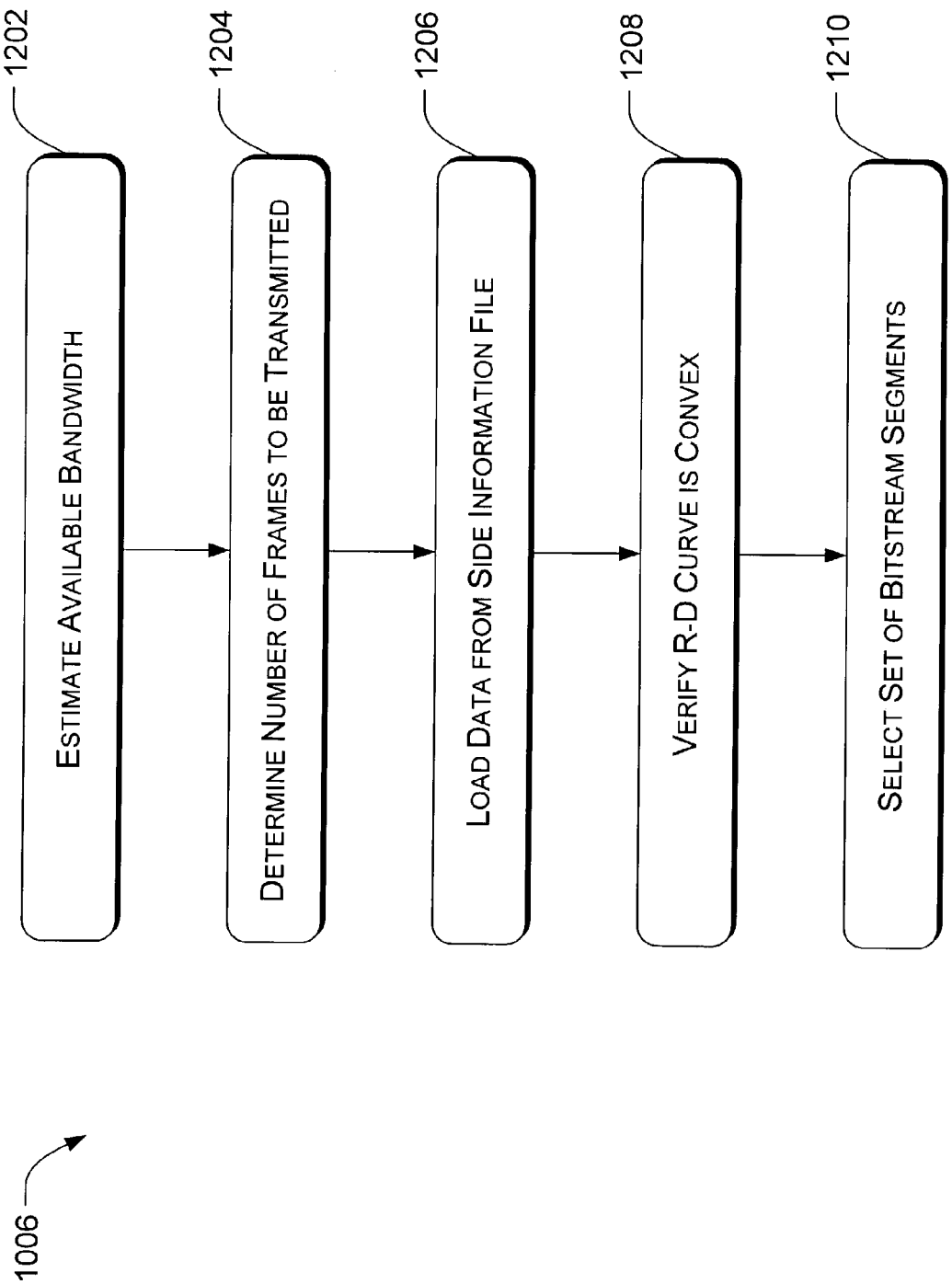
FIG. 12 illustrates an exemplary method for selecting a set of bitstream segments to be packetized.

FIG. 12 illustrates an exemplary method for selecting a set of bitstream segments to be packetized.

At block 1202, bitstream selector 118 estimates an available bandwidth associated with network 106 for a particular time slot.

At block 1204, bitstream selector 118 determines a number (M) of frames to be transmitted based on the frame rate, which is an intrinsic charasteric of a video stream.

At block 1204, bitstream selector 118 loads the data stored in the side information file. (This includes a position, a required bitrate, and a total contribution to distortion reduction for each encoded bitstream segment.)

At block 1206, bitstream selector 118 examines the rates and contributions to distortion reduction for different bitplanes of the same macroblock to verify that the R-D curve is convex, which ensures that a solution to the previously defined Lagrangian minimization problem can be obtained.

At block 1208, bitstream selector 118 selects a set of bitstream segments for each macroblock based on the equal-slope argument of a standard Lagrangian minimization problem.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   generating a plurality of encoded bitstream segments by applying a layered coding scheme to a video stream;
   calculating a contribution to distortion reduction associated with each of the plurality of encoded video bitstream segments according to a formula:

$$\Delta D(f,l,i) = \Delta D_0(f,l,i) + \Delta D_{dr}(f,l,i)$$

wherein:
   $\Delta D_0(f,l,i)$ represents a distortion reduction of a bitstream segment associated with an $f^{th}$ frame, an $l^{th}$ bitplane, and an $i^{th}$ macroblock; and
   $\Delta D_{dr}(f,l,i)$ represents a drifting suppression of the bitstream segment associated with the $f^{th}$ frame $l^{th}$ bitplane, and $i^{th}$ macroblock;
   selecting multiple bitstream segments from the plurality of encoded bitstream segments based on a comparison of the contribution to distortion reduction associated with individual ones of the encoded bitstream segments; and
   packetizing the multiple bitstream segments into data packets such that a first data packet contains bitstream segments associated with multiple bit-planes of a first macro block, and such that no other one of the data packets contains bitstream segments associated with the first macro block.

2. The method as recited in claim 1 wherein the layered coding scheme comprises a fine granularity scalable coding scheme.

3. The method as recited in claim 1 wherein the layered coding scheme comprises a progressive fine granularity scalable coding scheme.

4. The method as recited in claim 3 wherein the progressive fine granularity scalable coding scheme is frame-based.

5. The method as recited in claim 3 wherein the progressive fine granularity scalable coding scheme is macroblock based.

6. The method as recited in claim 1 wherein the selecting is further based on an available bandwidth.

7. The method as recited in claim 1 wherein the selecting comprises:
determining a bitrate associated with individual ones of the plurality of encoded bitstream segments;
determining an available bandwidth;
and selecting the multiple bitstream segments such that for each bitstream segment that is selected, the associated bitrate is supported by the available bandwidth and the associated contribution to distortion reduction is greater than or equal to a contribution to distortion reduction associated with at least one of the plurality of bitstream segments that is not selected.

8. The method as recited in claim 1 wherein the first data packet also contains bitstream segments associated with multiple bit-planes of a second macro block.

9. A method comprising:
generating a plurality of encoded bitstream segments by applying a layered coding scheme to a video stream;
selecting multiple bitstream segments from the plurality of encoded bitstream segments;
representing multiple enhancement layers associated with a frame as a binary tree wherein each node of the tree represents a particular one of the multiple bitstream segments, and wherein each child node of the binary tree is aligned with an edge of a parent node; and
generating multiple data packets such that each data packet that contains a child node also contains a parent node associated with the child node.

10. A method comprising:
identifying a plurality of encoded video bitstream segments to be packetized;
arranging the encoded video bitstream segments according to a binary tree that represents enhancement layers of a frame; and
packetizing the encoded video bitstream segments into data packets according to the binary tree such that each data packet comprises a parent node and a child node of the binary tree.

11. The method as recited in claim 10 further comprising:
pruning the binary tree to remove individual bitstream segments according to a distortion reduction contribution threshold.

12. A method comprising:
calculating a contribution to distortion reduction associated with each of a plurality of encoded video bitstream segments according to a formula:

$$\Delta D(f,l,i) = \Delta D_0(f,l,i) + \Delta D_{dr}(f,l,i)$$

wherein:
$\Delta D_0(f,l,i)$ represents a distortion reduction of a bitstream segment associated with an $f^{th}$ frame, an $l^{th}$ bitplane, and an $i^{th}$ macroblock; and
$\Delta D_{dr}(f,l,i)$ represents a drifting suppression of the bitstream segment associated with the $f^{th}$ frame, $l^{th}$ bitplane, and $i^{th}$ macroblock;
identifying for packetization, a subset of the plurality of encoded video bitstream segments based on a comparison of the contribution to distortion reduction; and
packetizing the subset of the plurality of encoded bitstream segments into data packets such that a first data packet contains bitstream segments associated with multiple bit-planes of a first macro block, and such that no other one of the data packets contains bitstream segments associated with the first macro block.

13. The method as recited in claim 12 wherein the packetizing further comprises:
raster-scan ordering the subset of the plurality of encoded bitstream segments in the first data packet according to the distortion reduction contribution of each bitstream segment associated with the first macro block.

14. A system comprising:
an encoder configured to generate encoded bitstream segments;
a bitstream selector configured to select a set of the encoded bitstream segments for packetization; and
a packet generator configured to packetize the set of the encoded bitstream segments according to a binary tree packetization strategy that minimizes dependency between packets.

15. The system as recited in claim 14, wherein the encoder is implemented as a fine granularity scalable encoder.

16. The system as recited in claim 14, wherein the encoder is implemented as a progressive fine granularity scalable encoder.

17. The system as recited in claim 14, wherein the encoder is implemented as a frame-based progressive fine granularity scalable encoder.

18. The system as recited in claim 14, wherein the encoder is implemented as a macroblock-based progressive fine granularity scalable encoder.

19. The system as recited in claim 14, wherein the encoder is further configured to gather data describing a position, a required bitrate, and a contribution to distortion reduction associated with an encoded bitstream segment.

20. A system comprising:
means for encoding streaming video data using a layered coding scheme, resulting in a plurality of encoded bitstream segments;
means for selecting a set of the encoded bitstream segments based on a contribution to distortion reduction associated with individual ones of the plurality of encoded bitstream segments, wherein the contribution to distortion reduction is calculated according to a formula:

$$\Delta D(f,l,i) = \Delta D_0(f,l,i) + \Delta D_{dr}(f,l,i)$$

wherein:
$\Delta D_0(f,l,i)$ represents a distortion reduction of a bitstream segment associated with an $f^{th}$ frame, an $l^{th}$ bitplane, and an $i^{th}$ macroblock; and
$\Delta D_{dr}(f,l,i)$ represents a drifting suppression of the bitstream segment associated with the $f^{th}$ frame, $l^{th}$ bitplane, and $i^{th}$ macroblock; and
means for generating data packets containing the set of encoded bitstream segments such that a first data packet contains encoded bitstream segments associated with multiple bit-planes of a first macro block, and such that no other one of the data packets contains bitstream segments associated with the first macro block, so that_the packetized bitstream segments are arranged to reduce dependency between individual ones of the data packets.

21. The system as recited in claim 20 wherein the generating means further comprises:
means for organizing the set of encoded bitstream segments within the data packets based on contributions to distortion reduction associated with individual encoded bitstream segments of the set of encoded bitstream segments.

22. The system as recited in claim 20 wherein the generating means further comprises:

means for organizing the set of encoded bitstream segments within the data packets in a decreasing order based on contributions to distortion reduction associated with individual encoded bitstream segments of the set of encoded bitstream segments.

23. The system as recited in claim 20 further comprising:
means for selecting the set of encoded bitstream segments based on an available bandwidth.

24. One or more computer-readable media comprising computer executable instructions that, when executed, direct a computing system to:
calculate the contribution to distortion reduction associated with each of a plurality of encoded video bitstream segments according to a formula:

$$\Delta D(f,l,i) = \Delta D_0(f,l,i) + \Delta D_{dr}(f,l,i)$$

wherein:
$\Delta D_0(f,l,i)$ represents a distortion reduction of a bitstream segment associated with an $f^{th}$ frame, an $l^{th}$ bitplane, and an $i^{th}$ macroblock; and
$\Delta D_{dr}(f,l,i)$ represents a drifting suppression of the bitstream segment associated with the $f^{th}$ frame, $l^{th}$ bitplane, and $i^{th}$ macroblock;
determine a subset of the plurality of encoded video bitstream segments based on a comparison of the contribution to distortion reduction; and
generate a data packet containing the selected subset of video bitstream segments.

25. The one or more computer-readable media as recited in claim 24 further comprising computer executable instructions that, when executed, direct a computing system to:
calculate the drifting suppression according to a formula:

$$\Delta D_{dr}(f, l, i) = \Delta D_0(f, l, i) \times \sum_{n=1}^{N} \left[ \prod_{k=1}^{n} R_{HH}(f+k) + \prod_{k=1}^{n-1} R_{HH}(f+k) \times R_{HL}(f+n) \right]$$

wherein:
$\Delta D_0(f,l,i)$ represents a distortion reduction of a bitstream segment associated with an $f^{th}$ frame, an $l^{th}$ bitplane, and an $i^{th}$ macroblock;

$R_{HH}(f)$ represents a percentage of high-prediction-high-reference (HPHR) modes in an $f^{th}$ frame;
$R_{HL}(f)$ represents a percentage of high-prediction-low-reference (HPLR) modes in an $f^{th}$ frame; and
N is a number of frames used for drifting estimation.

26. The one or more computer-readable media as recited in claim 24, wherein each of the plurality of encoded video bitstream segments is encoded according to a layered coding scheme.

27. The method as recited in claim 9 wherein the layered coding scheme comprises a fine granularity scalable coding scheme.

28. The method as recited in claim 9 wherein the selecting comprises:
selecting multiple bitstream segments from the plurality of encoded bitstream segments based on an available bandwidth.

29. The method as recited in claim 9 wherein the selecting comprises:
selecting multiple bitstream segments based on contributions to distortion reduction associated with individual ones of the encoded bitstream segments.

30. The method as recited in claim 9 wherein the selecting comprises:
determining a bitrate associated with individual ones of the plurality of encoded bitstream segments;
estimating a contribution to distortion reduction associated with individual ones of the plurality of encoded bitstream segments;
determining an available bandwidth; and
selecting the multiple bitstream segments such that for each bitstream segment that is selected, the associated bitrate is supported by the available bandwidth and the associated contribution to distortion reduction is greater than or equal to a contribution to distortion reduction associated with at least one of the plurality of bitstream segments that is not selected.

31. The method as recited in claim 1 wherein the packetizing further comprises:
raster-scan ordering the bitstream segments in the first data packet according to the distortion reduction contribution of each bitstream segment associated with the first macro block.

* * * * *